US006991667B2

(12) United States Patent
Yang et al.

(10) Patent No.: US 6,991,667 B2
(45) Date of Patent: Jan. 31, 2006

(54) ATTACHING AND DETACHING DEVICE FOR CONTAMINANT COLLECTING RECEPTACLE OF CYCLONE SEPARATOR

(75) Inventors: Il-won Yang, Gwangju (KR); Dong-yun Lee, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 103 days.

(21) Appl. No.: 10/836,301

(22) Filed: Apr. 30, 2004

(65) Prior Publication Data

US 2005/0072130 A1 Apr. 7, 2005

(30) Foreign Application Priority Data

Oct. 7, 2003 (KR) ...................... 10-2003-0069641

(51) Int. Cl.
*B01D 45/18* (2006.01)
*A47L 9/16* (2006.01)

(52) U.S. Cl. ........................ 55/429; 55/490; 55/DIG. 3; 15/352

(58) Field of Classification Search .................. 55/429, 55/337, 428, 459.1, 490, DIG. 3; 15/352, 15/353
See application file for complete search history.

(56) References Cited

U.S. PATENT DOCUMENTS 6,578,230 B2 * 6/2003 Park et al. .................... 15/353
6,589,309 B2 * 7/2003 Oh et al. ...................... 55/429
6,782,584 B2 * 8/2004 Choi .......................... 15/352
6,916,351 B2 * 7/2005 Oh ............................ 55/304
2003/0221277 A1 * 12/2003 Oh et al. ...................... 15/328
2004/0123416 A1 * 7/2004 Lee ............................ 15/352

FOREIGN PATENT DOCUMENTS

GB 2384974 8/2003
GB 2401777 11/2004

* cited by examiner

*Primary Examiner*—Frank M. Lawrence
(74) *Attorney, Agent, or Firm*—Ladas & Parry LLP

(57) ABSTRACT

An attaching and detaching device for a contaminant collecting receptacle of a cyclone separator in a vacuum cleaner includes a sealing member having a through hole for providing fluid communication and air flow, a lever member surrounding the sealing member, and a guide member to guide upward and downward displacement of the lever member depending on the direction of displacement of the guide member.

11 Claims, 5 Drawing Sheets

ATTACHING AND DETACHING DEVICE FOR CONTAMINANT COLLECTING RECEPTACLE OF CYCLONE SEPARATOR

BACKGROUND OF THE INVENTION

1. Field of the Invention

The present invention generally relates to a releasably attaching and detaching device for a contaminant collecting receptacle of a cyclone separator. More specifically, the present invention relates to a releasably attaching and detaching device having a lever member that is vertically movable according to the movement of a guide member, formed at a motor cover, and surrounding a sealing member so that a contaminant collecting receptacle is releasably attached and detached to and from a cyclone separator.

2. Description of the Background Art

In general, a cyclone separator centrifugally separates contaminants from air drawn into a vacuum cleaner, in which dust, dirt and contaminants are entrained, and discharges cleaned air. The cyclone separator includes a contaminant collecting receptacle, which collects the separated contaminants, and which is detachably coupled to the cyclone separator.

In attaching the contaminant collecting receptacle to the cyclone separator, the contaminant collecting receptacle is latched to the cyclone separator and is detached by using a handle formed on the contaminant collecting receptacle, which may be in the form of a drawer handle. The receptacle may generally have a construction and operation similar to that of a drawer.

FIG. 1 is a schematic view illustrating the cyclone separator applying the conventional mechanism having a configuration of a drawer for attaching and detaching the contaminant colleting receptacle by means of a handle. Referring to FIG. 1, a vacuum cleaner, having the conventional cyclone separator and the contaminant collecting receptacle having the configuration of a drawer for attachment and detachment, includes a cleaner body 50, shown by a broken line, and a brush 43 through which dust and dirt on a surface to be cleaned are drawn in with the air.

The cleaner body 50 includes a cyclone separator 30, a contaminant collecting receptacle 40, attachable to and detachable from the cyclone separator 30, and a motor 41 that generates a suction force for drawing air into the vacuum cleaner.

The cyclone separator 30 includes a grill 37 disposed in a cyclone body 28 to provide a first means to filter the contaminants.

An air inlet 31 is formed adjacent a side of the cyclone body 28, through which the dust-laden air is drawn in, and an air outlet 32 is formed adjacent the top or a side, through which the cleaned air is discharged. The air inlet 31 is in fluid communication with the brush 43 through a flexible hose 45. The cyclone separator 30 is well known to those skilled in the art and thus a detailed description of the cyclone separator 30 will be omitted for the sake of brevity.

A filter 29 is interposed between the grill 37 and the air outlet 32.

The contaminant collecting receptacle 40 is releasably latched to the cyclone body 28 by an appropriate latching member 34. A knob 39 is formed at an outer side of the contaminant collecting receptacle 40, so that once the collecting receptacle 40 is unlatched, it can be withdrawn from the cyclone body as if it were a drawer.

The air outlet 32 is in fluid communication with the motor 41 in the cleaner body 50 through a communication pipe 35.

The operation of the vacuum cleaner having the conventional cyclone separator 30 and the contaminant collecting receptacle 40 as configured and shaped above is described below.

When the motor 41 in the cleaner body 50 is switched on,it generates a suction force, and air containing dust and dirt collected from the surface to be cleaned is drawn in through the brush 43. The air flows into the cyclone body 28 via the flexible hose 45 and the inlet 31 directs the air into the cyclone body 28 in a direction tangential to the wall thereof.

The drawn in air thus forms a whirling air stream, and contaminants and dust are separated from the whirling air by centrifugal force and are collected into the contaminant collecting receptacle 40.

The air, from which contaminants have been removed, is discharged to the air outlet 32, first passing through the grill 37 and the filter 29. The grill 37 additionally separates fine dust from the clean air to prevent the fine dust from discharging out of the outlet 32.

The cleaned air discharged through the air outlet 32 flows to the motor 41 through the communication pipe 35 and is discharged to the outside environment through a discharging grill 55 formed at a wall of the cleaner body 50.

When a predetermined amount of contaminants has been collected in the contaminant collecting receptacle 40, the vacuum cleaner user detaches the contaminant collecting receptacle 40 from the cyclone body 28 using the latching member 34. By gripping the knob 39 connected to the contaminant collecting receptacle 40, the user can detach the contaminant collecting receptacle 40 from the cyclone body 28 and from the cleaner body 50 as if sliding out a drawer. After disposing of the contaminants, the user re-attaches the contaminant collecting receptacle 40 to the cyclone body 28 and the cleaner body 50 for further cleaning operation.

In detaching the contaminant collecting receptacle 40 from the cyclone body 28 and the cleaner body 50 as if sliding out a drawer, several problems may occur, as described below.

After the contaminants are separated from the whirling air in the cyclone 28 and are collected in the contaminant collecting receptacle 40 to exceed a predetermined threshold amount, it becomes difficult to attach to and detach the contaminant collecting receptacle 40 from the cyclone body 28 when only using the knob 39 formed at the contaminant collecting receptacle 40.

While attaching or detaching the contaminant collecting receptacle 40, the collected contaminants can spill over from the receptacle, thus to dirty the user's hand or clothes and to cause other sanitary problems.

In view of the air flow path, the suction force generated in the motor 41 is not directly transferred to the cyclone separator 30, since the suction force is transferred from the motor 41 to the outlet 32 through the communication pipe 35. Accordingly, fine dust may not be completely separated and filtered from the air stream, since the suction force is reduced and the reduced suction force is not completely transferred to the filter 29 at the cyclone body 28.

SUMMARY OF THE INVENTION

An aspect of the present invention is to solve at least the above problems and/or disadvantages and to provide the advantages described below. Accordingly, an aspect of the present invention is to provide an improved releasably attaching and detaching device for a contaminant collecting receptacle so that a user can easily attach to or detach the contaminant collecting receptacle from a cyclone separator and to provide a suction force generated by a motor that is directly transferred to the cyclone separator.

According to an embodiment of the present invention, the releasable attaching and detaching device for a cyclone body includes a sealing member having a central through hole for providing a fluid communication path, a lever member surrounding the sealing member, and a guide member to guide displacement of the lever member. The lever member is displaced upwardly and downwardly depending on the movement of the guide member.

The sealing member includes an annularly shaped sealing body having an inlet and an outlet, a first sealing part formed essentially around the inlet, a second sealing part formed essentially around the outlet, and a coupling rail formed around the sealing body to couple with the lever member and seal thereagainst.

The first and second sealing parts protrude radially outwardly from an outer surface of the sealing body. The lever member includes a lever body having a through hole for receiving the sealing member, and a rail projection formed around the through hole of the lever body to engage with the coupling rail of the sealing member. A grip is formed at an outer side of the lever body.

The lever member includes an inner wall formed around the through hole, an outer wall formed at an outer circumferential edge of the lever member, and a plurality of rails formed in the lever body. The rails include a plurality of first rails formed to extend in a circumferential direction adjacent the inner wall and a plurality of second rails formed between the first rails and the outer wall of the lever body.

The first and second rails are formed to slope upwardly along the extension in the circumferential direction and the second rails further include an internal slot defined by a first rail wall and a second rail wall where the second rail wall is formed between the first rail wall and the first rail.

The guide member includes a plurality of first guide projections formed at a side wall of the guide member, the first guide projections having a slope corresponding to the direction of the slope first rails, and a plurality of second guide projections formed and having a configuration and orientation so as to be able to be inserted into the space between the first and second rail walls.

The first guide projections are formed having a slope. A release prevention member is formed at a side of the second guide projections having a hook shape to prevent the second guide projection from disengaging from the second rails.

BRIEF DESCRIPTION OF THE DRAWING FIGURES

The above aspects and other features of the present invention will become more apparent by an understanding of the detailed description of the exemplary embodiments with reference to the attached drawing figures, in which:

FIG. 1 is a schematic view illustrating a cyclone separator using a conventional attaching and detaching mechanism for a contaminant collecting device;

FIG. 2 a cross-sectional view illustrating a cyclone separator having a releasably attaching and detaching device for a contaminant collecting device according to an embodiment of the present invention;

DETAILED DESCRIPTION OF THE EXEMPLARY EMBODIMENT

Figure 1:
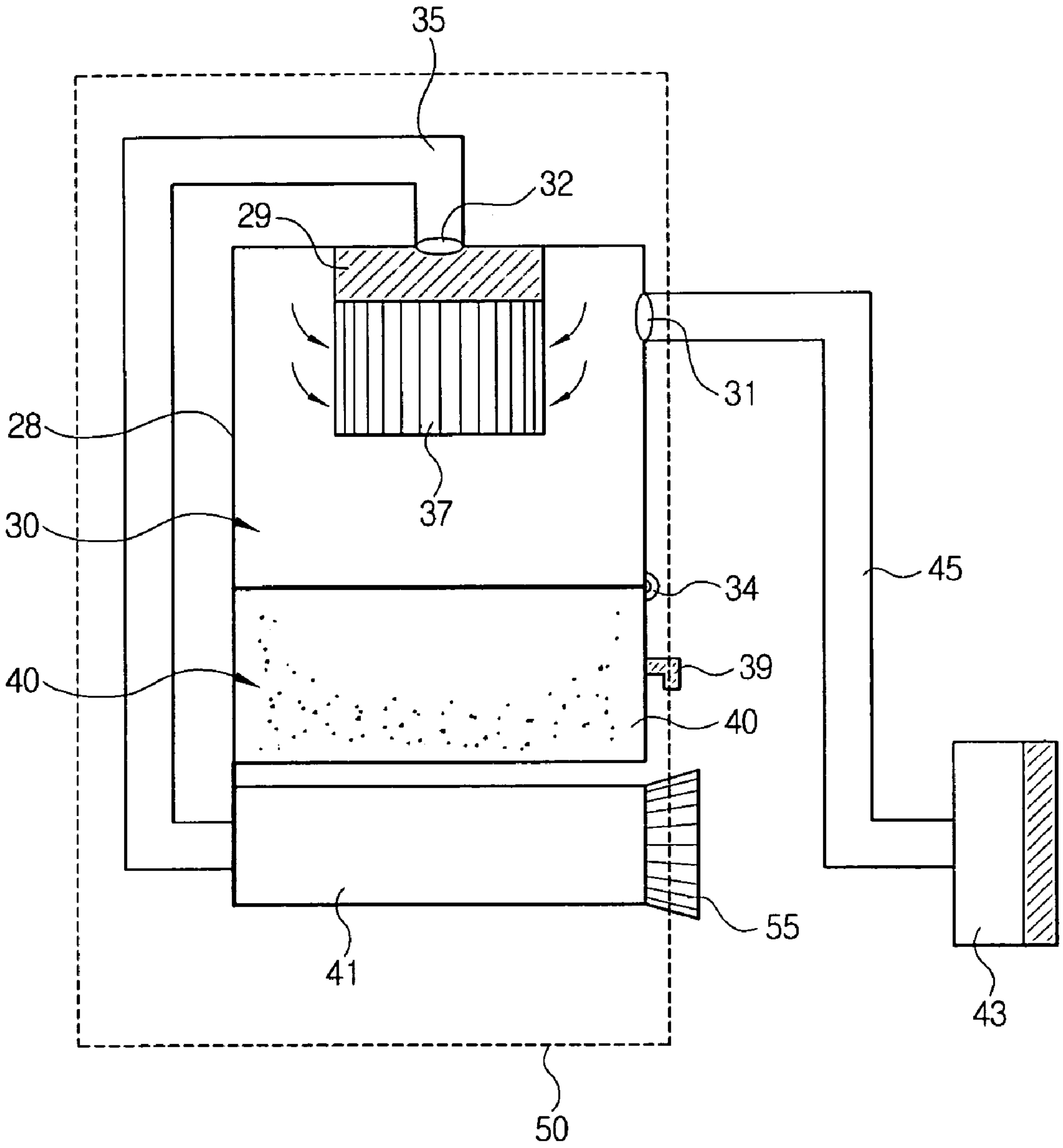
FIG. 1 (PRIOR ART)
Figure 2:
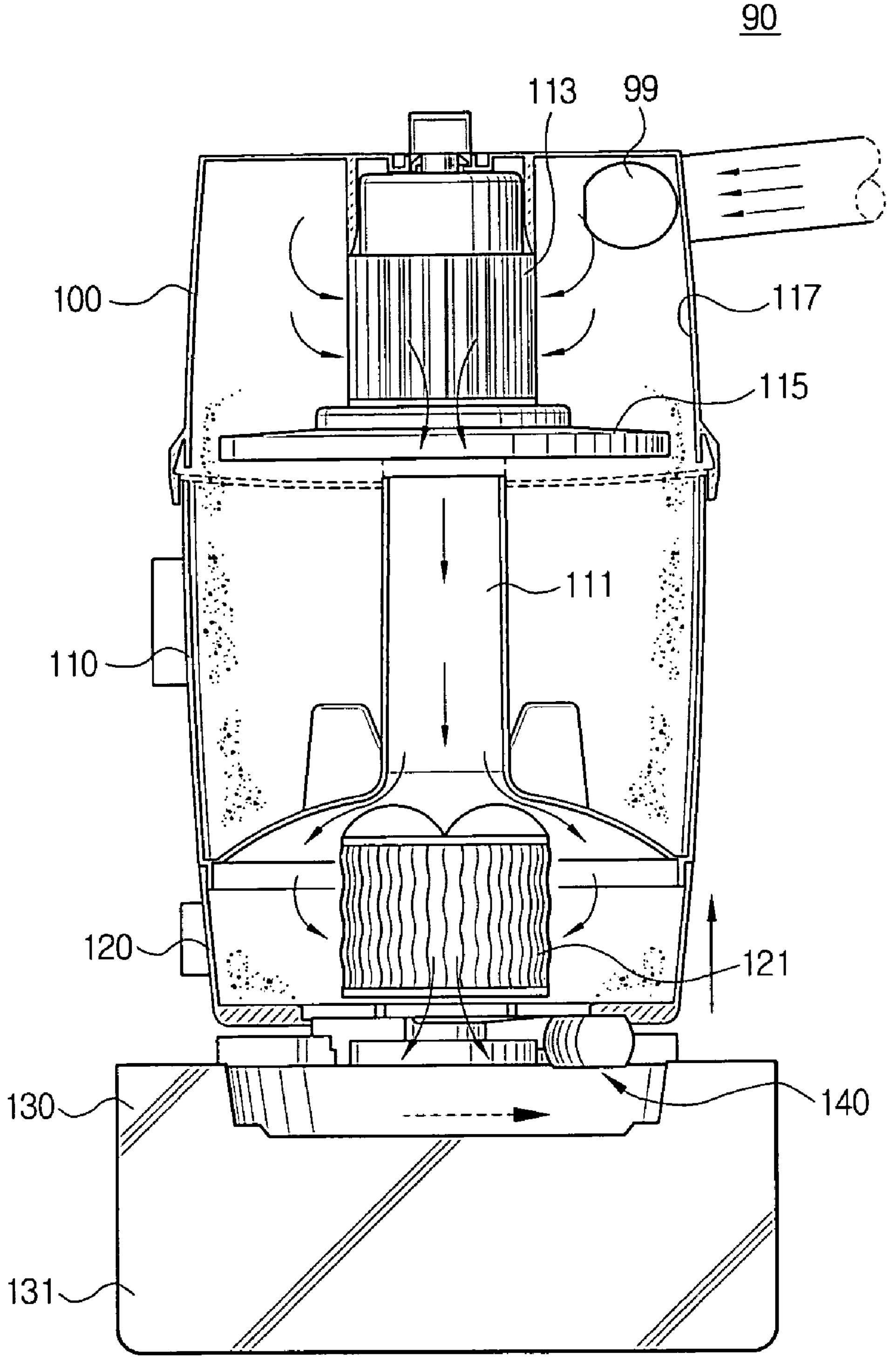

A cyclone separator having an attaching and detaching device for a contaminant collecting receptacle will be described in greater detail with reference to FIG. 2. FIG. 2 illustrates that the contaminant collecting receptacle 110 is coupled to the cyclone separator 90 by the releasably attaching and detaching device 140 according to an embodiment of the present invention.

The cyclone separator 90 includes a cyclone body 100 and the contaminant collecting receptacle 110.

The cyclone body 100 centrifugally separates and discharges contaminants from air drawn in to the cyclone separator 90. An air inflow opening 99 is formed at a side of the wall defining the cyclone body 100, through which the dirt-laden air is drawn in. A grill 113 is disposed in the cyclone body 100 to initially separate the contaminants from the air.

A contaminant backflow prevention member 115 is disposed under the grill 113 having a predetermined separation from an inner wall 117 of the cyclone body 100.

The contaminant collecting receptacle 110 is detachably coupled to a lower part of the cyclone body 100 and includes an air discharging path 111 therein which provides direct fluid communication with the grill 113.

A space is formed around the discharging path 111 of the contaminant collecting receptacle 110 for collecting the contaminants separated in the cyclone body 100. A filter case 120 is detachably disposed under the contaminant collecting receptacle 110 and has a filter assembly 121 therein, as shown. The filter case 120 is securely coupled to contaminant collecting receptacle 110 by the attaching and detaching device 140.

The filter assembly 121 provides for secondary separation of the fine dust which remains entrained in the air drawn in through the discharging path 111. The filter assembly 121 is coaxially disposed about the discharging path 111.

A motor (not shown) is installed within a motor cover 130 to generate a suction force for the cyclone body 110.

The releasably attaching and detaching device 140 is interposed between the filter case 120 and the motor cover 130 and provides a guide for the air discharged from the filter case 120 and directs it into a motor chamber 131.

The releasably attaching and detaching device 140 provides a fluid seal for air flowing between the filter case 120 and the motor chamber 131 and also moves the filter case 120 in the upward and downward directions.

Figure 3:
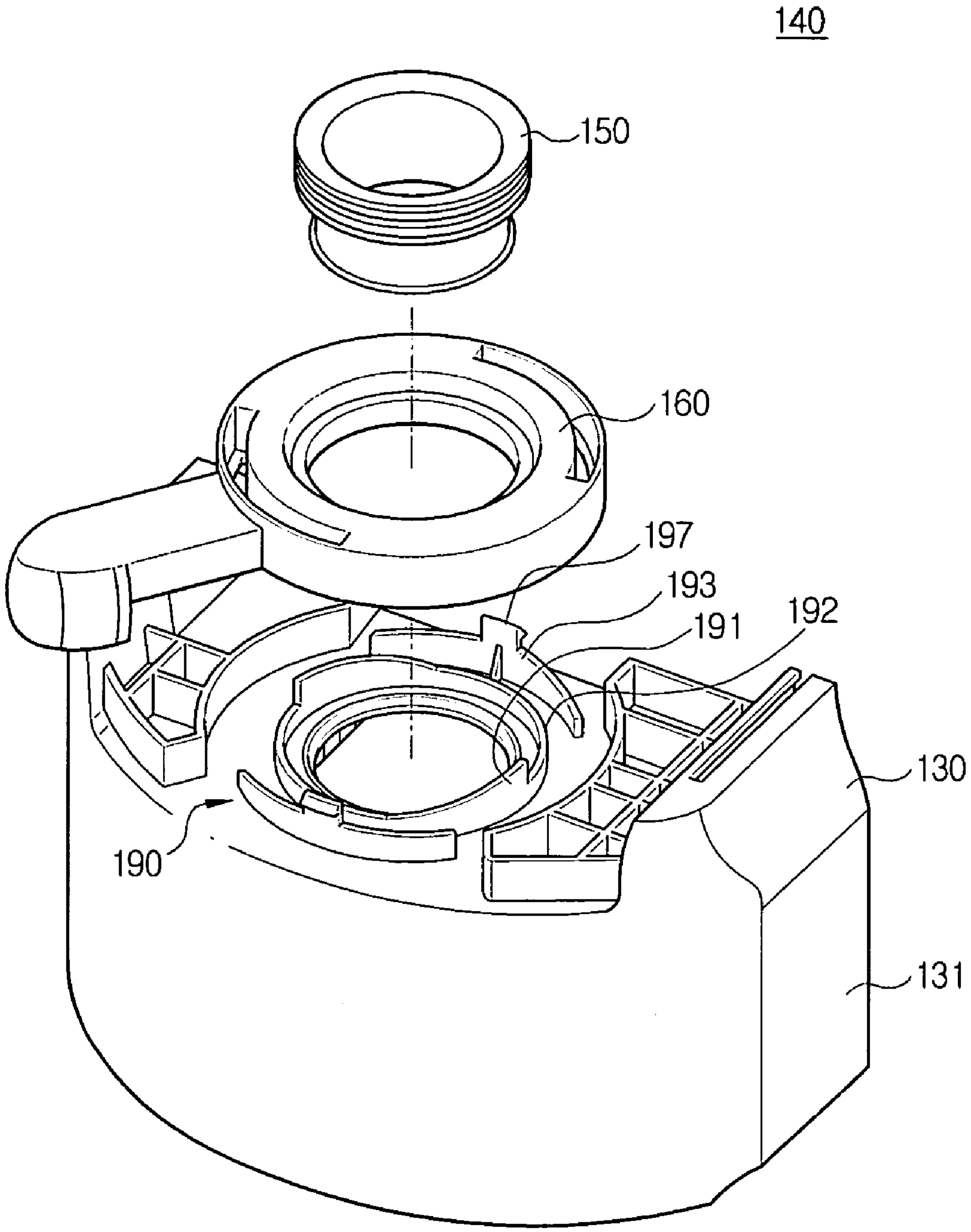
FIG. 3 is an exploded perspective view illustrating main parts of the releasably attaching and detaching device according to the embodiment of the present invention shown in FIG. 2.
Figure 4:
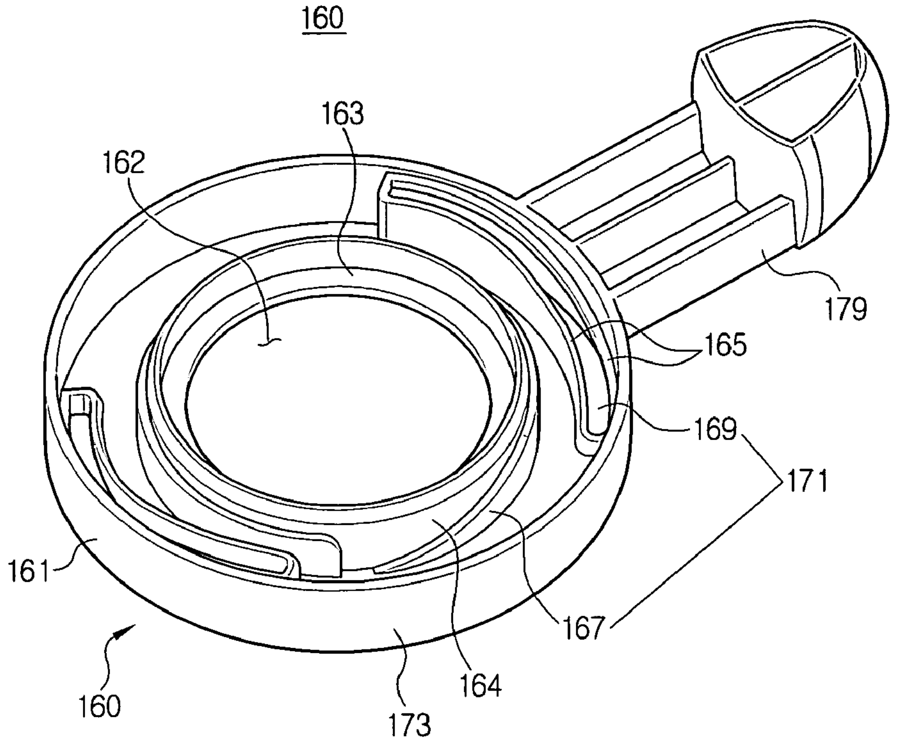
FIG. 4 is a bottom perspective view illustrating a lever member of the attaching and detaching device according to the embodiment of the present invention shown in FIGS. 2 and 3.
Figure 5:
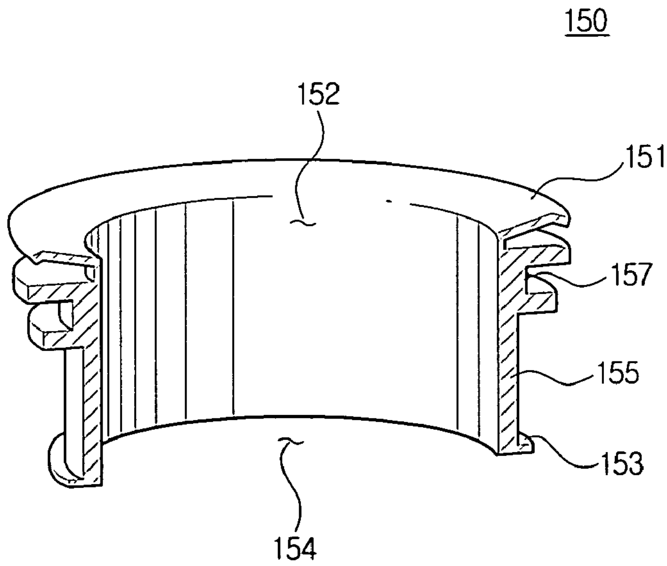
FIG. 5 is a cross-sectional view illustrating a sealing member of the attaching and detaching device according to the present invention.

Referring to FIGS. 3 through 5, the releasably attaching and detaching device 140 according to the embodiment of the present invention is described in greater detail.

FIG. 3 is an exploded perspective view illustrating the main parts of the releasably attaching and detaching device 140, including a lever member 160 and a sealing member 150. FIG. 4 is a bottom perspective view illustrating the lever member 160 of the attaching and detaching device 140. FIG. 5 is a cross-sectional view illustrating the sealing member 150 of the attaching and detaching device 140 in greater detail.

The releasably attaching and detaching device 140 includes the sealing member 150, the lever member 160, and a guide member 190, which is formed on the motor cover 130.

The sealing member 150 includes a sealing body 155, a first sealing part 151, a second sealing part 153, and a coupling rail 157. The sealing body 155 is in the shape of an annular cylinder and defines an internal aperture through which the drawn in air flows.

The sealing body 155 is a cylindrical shape and includes an inlet 152 at an upper part and an outlet 154 at a lower part, as shown in FIG. 5. The inlet 152 is connected to the filter case 120 and the outlet 154 is connected to the motor cover 130.

The first sealing part 151 is formed around the inlet 152 to seal the air discharged from the filter case 120. The second sealing part 153 is formed around the outlet 154 to seal the air discharged into motor chamber 131 defined by the motor cover 130.

The first and second sealing parts 151 and 153 protrude in an axial direction away from an outer surface of the cylindrical sealing body 155. The sealing member 150 is preferably made of a resilient material, such as rubber.

The coupling rail 157 is formed on the outer surface of the sealing body 155 and is configured to couple with a rail projection 163 (FIG. 4), which is formed on the lever member 160, while the lever member 160 surrounds the sealing member 150.

Referring to FIG. 4, the lever member 160 includes a lever body 161, the rail projection 163, and a plurality of rails 171. An annular through hole 162, is defined by the lever body 161, which is in cross-section circular, or substantially circular. The rail projection 163 protrudes along an inner wall 164, which is formed around the through hole 162, and extends radially inwardly from the inner wall 164 toward the through hole 162, to couple with the coupling rail 157 of the sealing member 150 (FIG. 5).

Inner walls 164 and an outer wall 173 of the lever body 161 are circular, or substantially circular in shape to define the annular lever body 161. The rails 171 are formed between the inner wall 164 and the outer wall 173 of the lever body 161, and include a plurality of first rails 167 and a plurality of second rails 169.

A grip 179 is formed or attached to the lever body 161 to provide means for moving or rotating the lever member 160.

The first rails 167 respectively are formed to slope upwardly as they extend in a circumferential direction adjacent the inner wall 164.

The second rails 169 respectively are formed between the first rail 167 and the outer wall 173 of the lever body 161, and slope in the same orientation and direction as they extend in a circumferential direction. Second rails 169 are defined by two upstanding walls, which have an opening between them, as shown. A second rail wall 165 is formed around the second rail 169.

As shown in FIG. 3, the guide member 190 is formed on the motor cover 130 enclosing the motor (not shown), which generates the suction force for the air flow through the sealing member 150. The guide member 190 guides the movement of the lever member 160.

The guide member 190 includes first guide projections 191 and second guide projections 193.

The first guide projections protrude upwardly from an end wall 192, which extends cylindrically around a central aperture. The first guide projections 191 has a slope to correspond to the slope of the first rail 167 of the lever member 160.

More than two first guide projections 191 can be formed along the circumference of the side wall 192, as shown.

The second guide projection 193 is formed to be inserted into the opening between the two upstanding walls 165 of the second rail 169 of the lever member 160 (FIG. 4). A release prevention member 197 is formed to extend outwardly at a side of the second guide projection 193 so as to prevent the second guide projection 193 from releasing the second rail 169 of the lever member 160 when they are engaged.

The release prevention member 197 is formed having a hook shape and may include a locking device to prevent the second guide projection 193 from releasing engagement of second rail 169.

Figure 6:
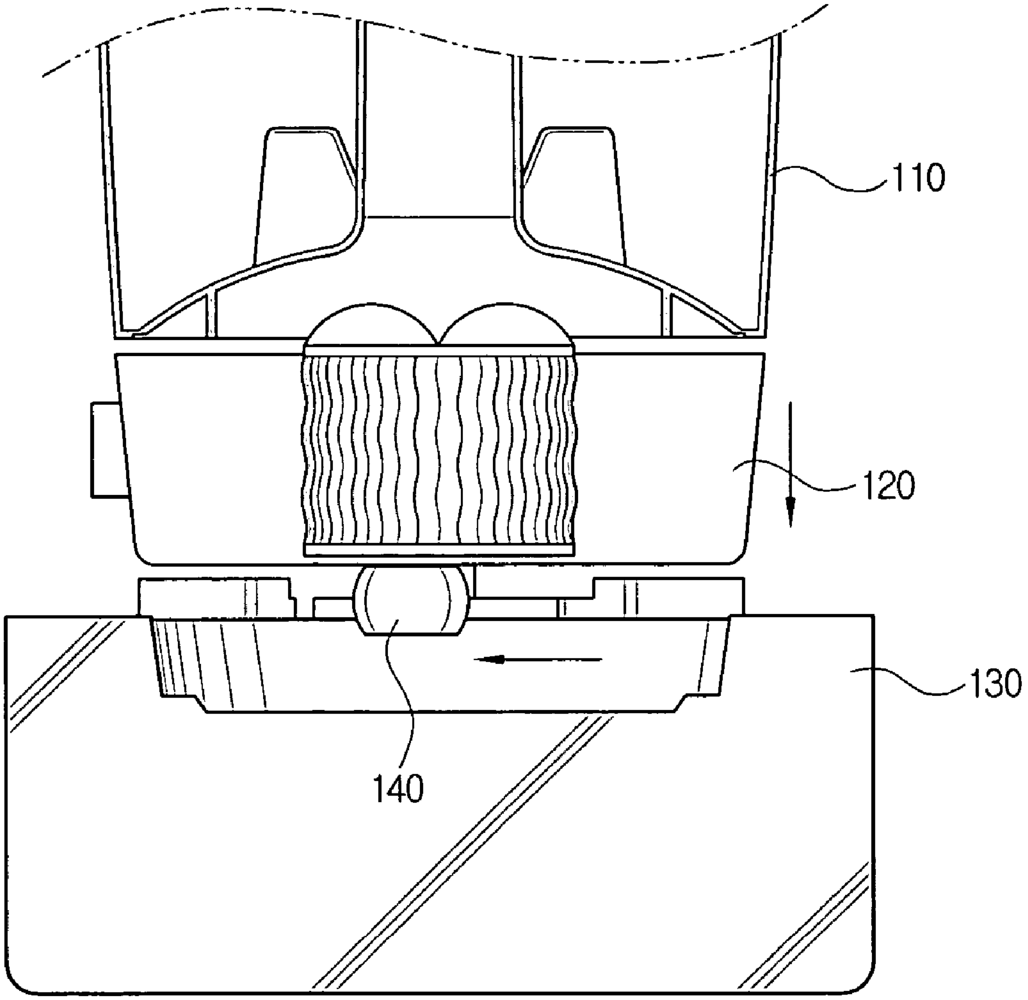
FIG. 6 is a plan view in partial cross-section illustrating the contaminant collecting receptacle, which is detached from the cyclone separator by operation of the attaching and detaching device according to the embodiment of the present invention.

Referring to FIGS. 2 through 6, the operation of the releasably attaching and detaching device 140 are described below. FIG. 6 illustrates the contaminant collecting receptacle 110 in a withdrawn position when it is detached from the cyclone separator 90 by the operation of the lever member 160 of the attaching and detaching device 140.

When suction force is generated by the motor (not shown) in the motor chamber 131, the air, in which contaminants are entrained, is drawn in through the inflow opening 99 of the cyclone body 100.

The drawn in air forms a whirling air stream in the cyclone body 100 and the dust and contaminants are separated from the air by the centrifugal force of the cyclonic whirling air stream.

The contaminants, once separated from the whirling air cyclone, fall as a result of gravity, and are collected in the contaminant collecting receptacle 110. The clean air then flows through the grill 113 and the discharging path 111 in the contaminant collecting receptacle 110 and is discharged to the filter case 120.

Fine dust which is separated by the filter assembly 121 of the filter case 120 is collected in the contaminant collecting receptacle 120 and the cleaned air flows through the releasably attaching and detaching device 140, as shown by the arrows in FIG. 2.

The cleaned air flows through the sealing member 150 of the attaching and detaching device 140 and is discharged to the outside by being directed through the motor cover 130 and out of a discharging grill (not shown).

When a predetermined threshold level of the contaminants is collected in the contaminant collecting receptacle 110 or in the filter case 120, the collected contaminants require disposal. Disposal is effected by detaching the filter case 120 or the contaminant collecting receptacle 110 from the cyclone body 100.

When a user moves the grip 179, formed at the lever member 160 of the attaching and detaching device 140, to the right, the rails 171 formed at the lever member 160 of the attaching and detaching device 140 cause the rotation and displacement of the lever member body 160, which is in close contact with the first and second guide projections 191 and 193 of the guide member 190.

The first and second guide projections 191 and 193 of the guide member 190 are displaced upwardly (FIG. 2) or downwardly (FIG. 6) depending on the rotation direction when rotating the lever member 160 as it moves in close contact with the first and second rails 167 and 169 of the rails 171, which are formed with the corresponding slopes.

The coupling rail 157 of the sealing member 150 is coupled with the rail projection 163 of the lever member 160 to guide the rotation of the lever member 160.

When the lever member 160 moves to the right or left, the lever member 160 moves upwardly or downwardly, respectively, along the guide member 190 of the motor cover 130.

When moving along the guide member 190, the lever member 160 moves together with the sealing member 150, that is, the lever member 160 rotates in a predetermined direction to causing the vertical displacement of the lever member 160 and the sealing member 150. Accordingly, the sealing member 150 seals between the filter case 120 and the motor cover 130, and between the contaminant collecting receptacle 110 and the filter case 120, when in the operational upwardly vertical position. When disposing of collected contaminants, the lever member 160 and sealing member 150 are lowered by movement of grip 179 toward the left, so as to cause the downward displacement of the assembly thereby permitting the contaminant collecting receptacle 110 to be detached from the cyclone body 100.

Since the filter case 120 is securely fixed to the attaching and detaching device 140, the contaminant collecting receptacle 110 alone is detached from the cyclone body 100. When replacing the containment collecting receptacle 110 within the cyclone body 100, the grip 179 is displaced toward the right, thus vertically raising the assembly of the lever member 160 and sealing member 150 until it seals against the lower surface of the filter case 120.

As shown in FIG. 6, when the grip 179 of the attaching and detaching device 140 is moved to the left, the filter case 120 moves downwardly and the contaminant collecting receptacle 110 becomes detachable from the cyclone body 100. As shown in FIG. 2, when the grip 179 is moved toward the right, the filter case 120 and the contaminant collecting receptacle 110 move upwardly and so again is attached to the cyclone body 100.

After detaching the contaminant collecting receptacle 110 from the filter case 120 and the cyclone body 100, the user can dispose of the contaminants collected in the contaminant collecting receptacle 110 and of the fine dust collected in the filter case 120, which itself is detachable from the contaminant collecting receptacle 110.

After disposing of the contaminants, the contaminant collecting receptacle 110 is again attachable to the cyclone body 100 and the filter case 120. The user mounts the contaminant collecting receptacle 110 between the cyclone body 100 and the filter case 120 and moves the lever member 160 to the right.

According to the embodiment of the present invention, the user can easily attach the contaminant collecting receptacle 110 to the cyclone separator 90 and detach it therefrom by using the attaching and detaching device 140.

While the contaminant collecting receptacle 110 is attached to the cyclone separator 90, the attaching and detaching device 140 also seals the fluid communication path between the filter case 120 and the motor chamber 131. Therefore, leakage of the suction force of the motor is inhibited and thus the contaminant collecting capacity of the cyclone separator 90 is enhanced.

While the embodiment of the present invention has been described, additional variations and modifications of the described embodiment may occur to those skilled in the art once they achieve an understanding of the basic inventive concepts. Therefore, it is intended that the appended claims shall be construed to include both the above embodiments and all such variations and modifications that fall within the spirit and scope of the invention.

What is claimed is:

1. A releasable device for attaching and detaching a contaminant collecting receptacle from a cyclone body, comprising:

- a sealing member having a central through hole for providing a fluid communication path;
- a lever member surrounding the sealing member; and
- a guide member to guide displacement of the lever member,
- wherein the lever member is displaced in an upwardly and downwardly depending on the direction of movement of the guide member.

2. The device of claim 1, wherein the sealing member comprises:

- an annularly shaped sealing body having an inlet and an outlet;
- a first sealing part formed essentially around the inlet;
- a second sealing part formed essentially around the outlet; and
- a coupling rail formed around the sealing body to engage with the lever member and seal thereagainst.

3. The device of claim 2, wherein the first and second sealing parts protrude radially outwardly from an outer surface of the sealing body.

4. The device of claim 2, wherein the lever member comprises:

- a lever body having a through hole for receiving the sealing member;
- a rail projection formed around the through hole of the lever body to engage with the coupling rail of the sealing member, and
- a grip formed at an outer side of the lever body.

5. The device of claim 4, wherein the lever member further comprises:

- an inner wall formed around the through hole; and
- an outer wall formed at an outer circumferential edge of the lever member; and
- a plurality of rails formed in the lever body.

6. The device of claim 5, wherein the rails further comprise:

- a plurality of first rails formed to extend in a circumferential direction adjacent the inner wall; and
- a plurality of second rails formed between the first rails and the outer wall of the lever body.

7. The device of claim 6, wherein the first and second rails are formed to slope upwardly along the extension in the circumferential direction and the second rails further comprise an internal slot defined by a first rail wall and a second rail wall.

8. The device of claim 7, wherein the second rail wall is formed between the first wall and the first rail.

9. The device of claim 7, wherein the guide member is cylindrical in shape and further comprises:

- a plurality of first guide projections formed at a side wall of the guide member, the first guide projections having a slope corresponding to the direction of the slope of the first rails; and
- a plurality of second guide projections formed and having a configuration and orientation so as to be able to be inserted into the space between the first and second rail walls.

10. The device of claim 9, wherein a release prevention member is formed at a side of the second guide projections to prevent the second guide projection from disengaging from the second rails.

11. The device of claim 10, wherein the release prevention member is formed having hook shape.

* * * * *